Nov. 26, 1935.  A. KEGRESSE  2,022,567

ENDLESS TRACK

Filed Aug. 11, 1933

INVENTOR:
Adolphe Kégresse
BY
ATTORNEY

Patented Nov. 26, 1935

2,022,567

UNITED STATES PATENT OFFICE 2,022,567

ENDLESS TRACK

Adolphe Kegresse, Courbevoie, France

Application August 11, 1933, Serial No. 684,718
In France August 31, 1932

6 Claims. (Cl. 305—10)

The invention relates to a section belt for the tracks of endless track vehicles and provides for the ready dismantling or interchanging of the elements of the tire.

The known metal-rubber tracks usually employed for endless track vehicles comprise in combination metal plates, tread blocks of plastic material and guiding and driving elements, the whole being assembled by means of bolts on an endless-belt.

Although all the aforementioned elements are detachable and independent of each other, this cannot be said of the belt, which is formed of one piece. This is evidently a very considerable disadvantage, because if any portion of the belt is damaged, the latter will have to be discarded within a short time. It even happens sometimes that breaks occur in the belt of a new or almost new track, which involves not only the rejection of the belt itself, but also a fairly considerable expenditure of labor for dismounting and recovering the detachable elements of the track which are themselves undamaged.

This lack of absolute reliability of the endless belt comprising a single piece of material obliges the users of vehicles employing such belts to have a spare complete track always available in case of an emergency.

There is therefore a very considerable interest in endeavouring to provide a belt composed of detachable elements which, as in the metal tracks for endless track vehicles, are adapted to engage each other in some manner so that they can be assembled or taken apart according to requirements.

In other branches of industry, use has always been made of transmission belts assembled by many different mechanical means. Sewn belts are also employed.

Unfortunately, none of these known means is applicable in the present instance, the conditions in which the belts are employed being quite different from those under which transmission belts operate. In fact, whereas in these other industrial applications, the belts are employed merely for transmission by non-positive drive namely by simple friction, in the present application belts are subjected to far more severe conditions.

Endless track vehicle belts must ensure traction. Experience has shown that for this purpose a positive drive is essential; hence the absolute necessity for a very uniform elongation in order to keep the pitch of the teeth on the belt quite regular. Furthermore the belt must offer under the rollers an absolutely continuous rolling track without irregularities at the risk of shocks incompatible with correct working, while at the same time allowing of high working speeds of the order of 20 metres or more per second.

In addition, the belt must be flexible, in order to ensure a high efficiency, be silent in operation, not require any maintenance, not be injured by mud, sand or snow, and be of an accessible price and so on.

All these desiderata, which heretofore it has only been possible to obtain by endless belts must be taken into consideration in providing a belt having detachable elements for driving endless track vehicles.

This also explains why heretofore sectional belts have not been found in tracks for endless track vehicles which must moreover be light, of simple construction and of low cost.

The present invention comprises a sectioned belt, in a single piece or with separate, detachable and interchangeable elements, which satisfies all the desiderata enumerated in the foregoing.

The accompanying drawing and the following description show by way of example one method of carrying the invention into effect. This means will be sufficiently characteristic to limit the scope of the invention in a precise manner.

If the mode of working of a metal-rubber track for an endless track vehicle of the type disclosed for example by the French Patent No. 640,138 or its second addition No. 34,697 is examined closely, it is found that the endless belt is jammed on each metal plate to which is attached the corresponding tread block and driving tooth, along a line perpendicular to its longitudinal axis by the bolts which secure the guiding and driving elements. This jamming acts over a certain length, that is to say over several centimetres, on either side of the aforesaid line, thus creating an area which is termed hereinafter the "neutral or clamping zone" over which area the belt possesses no flexibility.

One of the features of the present invention is to make use of this "clamping zone" to effect the assembling of the constituent elements of the belt. Another no less important feature is the utilization of the guiding and driving elements, the metal plates appropriate for this purpose and their securing bolts to effect the assembling of the ends of the belt elements to each other.

Figure 1:
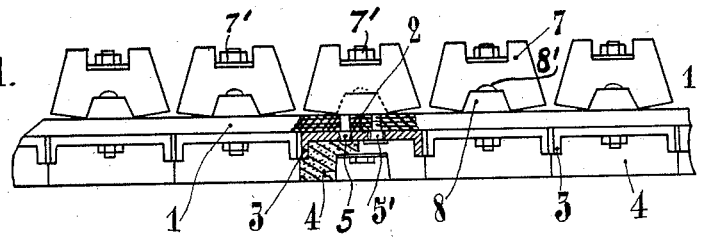
Figure 1 shows by way of example, in part section, an arrangement according to the invention, affecting merely a single element of the track.
Figure 2:
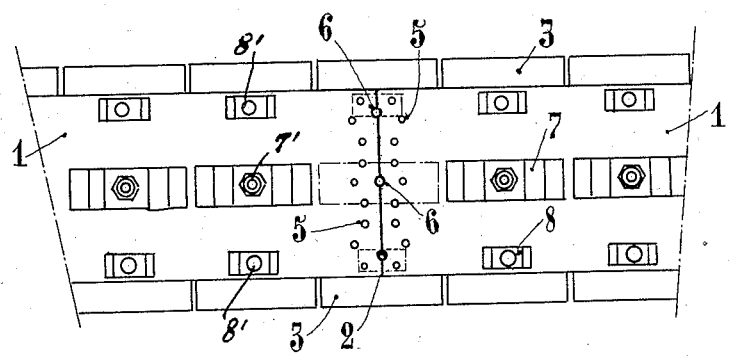
Figure 2 is a plan view of the belt shown in Figure 1.

In Figure 1, the elements comprising the belt are denoted by 1. As will be seen in this figure, these elements are arranged to touch each other end to end on the clamping line 2 (Figure 2). The metal plates 3, which support tread blocks 4, carry a series of studs 5 and 5' (Figure 1) which are fixed to the plates 3 by any known means.

By way of example, Figure 1 shows one of the studs 5' secured to the plate 3 by a threaded end, while the other adjacent stud 5 is fitted with a taper and rivetted or welded. Of course, the number of the studs 5 and 5' and their arrangement and the method of securing the same may vary. In Figure 2, they are arranged in offset relationship, but they are all in the neutral zone or portion of the belt which is maintained rigid by the clamping action between the plates 3 and driving elements and on either side of the clamping line 2 (Figure 2). As appears in Fig. 2, certain of the studs 5 merely connect the ends of the belt to plate 3, being positioned between the elements 7 and 8.

The ends of the belt sections are provided with holes 6 through which pass the clamping bolts 7' and 8' of the guiding elements 7 and driving elements 8 respectively (Figure 1).

The said elements being fixed in position, it will be quite readily appreciated that the belt ends will be assembled together without detriment to the flexibility of the system, which will remain the same as in the case of an endless track belt formed in a single piece.

Figure 3:
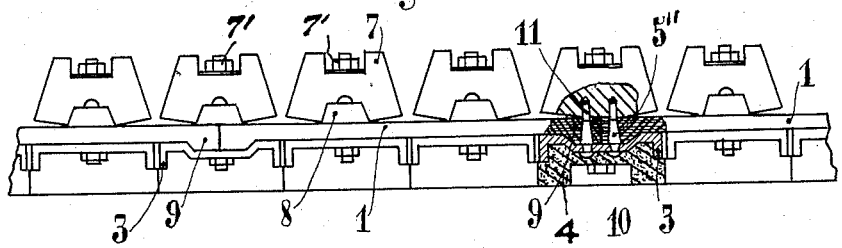
Figure 3 shows in part section another form of practical construction, the device being applied to a tire element.
Figure 4:
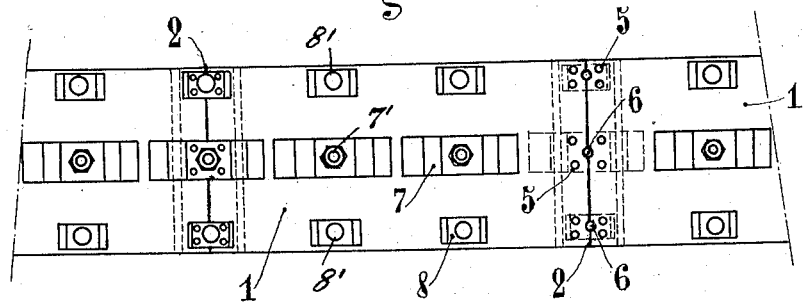
Figure 4 is a plan view of the belt shown in Figure 3.

It is also possible to provide belt sections with reinforced ends, which are shown by way of example in Figures 3 and 4. It will be seen that the belt section 1 has been reinforced at its ends 9 (Figure 3), the plates 3 being provided with recesses into which fit the corresponding reinforcements 9 of the ends of the belt 1.

It will likewise be seen in these figures that the belt section 1 carries two sets of elements: plates, blocks, guiding and driving elements and so on.

The studs 5" are shown tapered in Figure 3. In this way, they enable the use of smaller holes in the belt.

In addition, the reinforcement 9 possesses the considerable advantage of serving as a support for the belt end against the corresponding part 10 (Figure 3) of the metal plate 3. This support may be provided for example along a more or less obtuse angle. In the case shown in Figure 3, it will be seen that the bolts of the guiding and driving elements cause the reinforcement 9 to bear strongly against the plate 3, and it follows that the inclined part 10 participates to a considerable extent in the traction efforts of the belt 1, thus relieving the studs 5", the number and size of which may accordingly be reduced.

The inclined plane 10 (Figure 3) has also the effect of rendering it possible to obtain a tension on the belt sections at the moment the bolts for the guiding and driving elements are tightened.

It will be in fact appreciated that, since adjacent plates 3 have to be mounted to touch each other, it would be difficult to obtain from the belt element, at the moment of assembling, the necessary tension for its satisfactory working. The inclined plane 10 provides the means for obtaining this tension automatically.

The studs 5" may be extended upwardly to form a projecting part 11 (Figure 3) which engages the guiding and driving elements. This, while increasing the strength of the studs 5", which are thus anchored at both ends, serves as a stop for the guiding and driving elements to prevent the same from turning about their securing bolts.

The invention may be applied equally well to tires, in which the belt is in one piece, but not endless and joined together as described, and to tracks in which the belt comprises a plurality of elements connected together, according to the present invention.

In this order of ideas, it is quite possible to conceive a track for endless track vehicles, which track would have as many belt elements as there are metal plates and guiding and driving elements.

It is likewise possible to construct a tire composed for example of ten belt elements for forty guiding and driving elements; plates and shoes, each belt element thus carrying four plate-guiding and driving elements. It will be appreciated that the invention renders it possible to provide all desired combinations. The choice of the latter will be guided by questions of a practical nature affecting above all the cost price and the weight, which will vary furthermore with the size of the tire.

I claim:

1. A track for endless track vehicles, comprising a flexible belt for engaging the load supporting and driving surfaces of wheels on a vehicle, driving and guiding elements mounted on one surface of the belt for cooperating with wheels on the vehicle, tread-carrying plates mounted on the ground-engaging surface thereof, said belt being formed of sections, and means attaching the ends of adjoining belt sections to said plates for connecting the sections together, the ends of said belt sections being enlarged and the tread plates being provided with recesses for receiving the enlarged ends to more effectively connect the belt sections together and relieve the attaching means from at least a portion of the traction stresses of the belt, and the tractive load bearing surfaces of the recesses and of the enlargements on the ends of the belt sections being inclined to tighten the belt as the enlargements are forced into the recesses.

2. A track for endless track vehicles, comprising a flexible belt for engaging the load supporting and driving surfaces of wheels on a vehicle, groups of driving and guiding elements mounted on one surface of the belt for cooperating with wheels on the vehicle, tread-carrying plates mounted on the ground-engaging surface thereof, and means attaching a group of driving and guiding elements to each tread-carrying plate for clamping the belt therebetween, said attaching means being aligned in a single row extending transversely of said belt so as to reduce to a minimum the zone of said belt maintained rigid by the clamping action, said belt being formed in sections, and the ends of adjoining belt sections being located in one of the zones maintained rigid by the clamping action of one of the groups of attached elements and plates.

3. A track for endless track vehicles, comprising a flexible belt for engaging the load supporting and driving surfaces of wheels on a vehicle, groups of driving and guiding elements mounted on one surface of the belt for cooperating with wheels on the vehicle, tread-carrying plates mounted on the ground-engaging surface thereof, means attaching a group of driving and guiding elements to each tread-carrying plate for clamping the belt therebetween, said attaching means being aligned in a single row extending transversely of said belt so as to reduce to a minimum the zone of said belt maintained rigid by the clamping action, said belt being formed in sections, the ends of the adjoining belt sections being located in one of the zones maintained rigid by the clamping action of one of the groups of attached elements and plates, and means attaching the ends of adjoining belt sections to said plates for connecting the sections together.

4. A track for endless track vehicles, comprising a flexible belt for engaging the load supporting and driving surfaces of wheels on a vehicle, groups of driving and guiding elements mounted on one surface of the belt for cooperating with wheels on the vehicle, tread-carrying plates mounted on the ground-engaging surface thereof, means attaching a group of driving and guiding elements to each tread-carrying plate for clamping the belt therebetween, said attaching means being aligned in a single row extending transversely of said belt so as to reduce to a minimum the zone of said belt maintained rigid by the clamping action, said belt being formed in sections, the ends of adjoining belt sections being located in one of the zones maintained rigid by the clamping action of one of the groups of attached elements and plates, and means attaching the ends of adjoining belt sections to the guiding and driving elements for connecting the sections together.

5. A track for endless track vehicles, comprising a flexible belt for engaging the load supporting and driving surfaces of wheels on a vehicle, groups of driving and guiding elements mounted on one surface of the belt for cooperating with wheels on the vehicle, tread-carrying plates mounted on the ground-engaging surface thereof, means attaching a group of driving and guiding elements to each tread-carrying plate for clamping the belt therebetween, said attaching means being aligned in a single row extending transversely of said belt so as to reduce to a minimum the zone of said belt maintained rigid by the clamping action, said belt being formed in sections, the ends of the adjoining belt sections being located in one of the zones maintained rigid by the clamping action of one of the groups of attached elements and plates, and means connecting the ends of adjoining belt sections to said plates for connecting the sections together, the ends of said belt sections through which the section connecting means pass being enlarged and the tread plates being provided with recesses for receiving the enlarged ends to more effectively connect the belt sections together and relieve the attaching means from at least a portion of the traction stresses of the belt.

6. A track for endless track vehicles, comprising a flexible belt for engaging the load supporting and driving surfaces of wheels on a vehicle, groups of driving and guiding elements mounted on one surface of the belt for cooperating with wheels on the vehicle, tread-carrying plates mounted on the ground-engaging surface thereof, means attaching a group of driving and guiding elements to each tread-carrying plate for clamping the belt therebetween, said attaching means being aligned in a single row extending transversely of said belt so as to reduce to a minimum the zone of said belt maintained rigid by the clamping action, said belt being formed in sections, the ends of the adjoining belt sections being located in one of the zones maintained rigid by the clamping action of one of the groups of attached elements and plates, and means connecting the ends of adjoining belt sections to said plates for connecting the sections together, the ends of said belt sections through which the connecting means pass being enlarged and the tread plates being provided with recesses for receiving the enlarged ends to more effectively connect the belt sections together and relieve the attaching means from at least a portion of the traction effects of the belt, and the tractive load carrying surfaces of the recesses and of the enlargements on the ends of the belt sections being inclined to tighten the belt as the enlargements are forced into the recesses.

ADOLPHE KEGRESSE.